United States Patent [19]

Cawlfield et al.

[11] Patent Number: 5,411,643
[45] Date of Patent: May 2, 1995

[54] INTEGRATED PROCESS OF USING CHLORIC ACID TO SEPARATE ZINC OXIDE AND MANGANESE OXIDE

[75] Inventors: David W. Cawlfield; Leslie R. Ward, both of Cleveland, Tenn.

[73] Assignee: Olin Corporation, Stamford, Conn.

[21] Appl. No.: 228,631

[22] Filed: Apr. 18, 1994

Related U.S. Application Data

[63] Continuation-in-part of Ser. No. 180,838, Jan. 12, 1994, which is a continuation-in-part of Ser. No. 987,503, Dec. 7, 1992, Pat. No. 5,279,743.

[51] Int. Cl.[6] .......................... C25C 1/16; C01G 45/02
[52] U.S. Cl. ...................................... 204/115; 423/49; 423/50; 423/51; 423/605
[58] Field of Search ...................... 423/49, 50, 51, 605; 204/115

[56] References Cited

U.S. PATENT DOCUMENTS

| | | | |
|---|---|---|---|
| 2,956,860 | 10/1960 | Welsh | 423/605 |
| 3,056,656 | 10/1962 | Nicolaisen | 423/476 |
| 3,640,683 | 2/1972 | Miyazaki et al. | 423/49 |
| 4,402,931 | 9/1983 | Tanabe et al. | 423/605 |
| 4,465,569 | 8/1984 | Bjune et al. | 204/115 |
| 5,279,743 | 1/1994 | Ward et al. | 423/49 |

*Primary Examiner*—Steven Bos
*Attorney, Agent, or Firm*—William A. Simons

[57] ABSTRACT

A process for producing manganese dioxide and zinc metal comprising the steps of:
(1) reacting a mixture of zinc oxide and manganese oxide with an aqueous chloric acid solution wherein the chloric acid is in molar excess of the manganese oxide in a reaction zone to form a reaction mixture in the zone comprising chlorine gas, a solid phase containing manganese dioxide, and a liquid phase containing zinc oxide, chloric acid and water; the concentration of chloric acid in the liquid phase is greater than about 1% by weight of the liquid phase upon leaving the reaction zone;
(2) separating the chlorine gas from the solid phase and the liquid phase;
(3) separating the solid phase containing manganese dioxide from the liquid phase containing zinc ions, chlorate ions, chloric acid, and water thereby forming a separated solid phase and a separated liquid phase;
(4) subjecting the separated liquid phase to electrolysis in an electrochemical cell, thereby producing zinc metal at the cathode and oxygen at the anode;
(5) removing water from said separated liquid phase to concentrate the chloric acid in the separated liquid phase thereby forming a separated solid phase and a separated liquid phase;
(6) returning the separated and concentrated liquid phase back to the reaction zone; and
(7) recovering the zinc metal from the electrolytic cell.

13 Claims, 1 Drawing Sheet

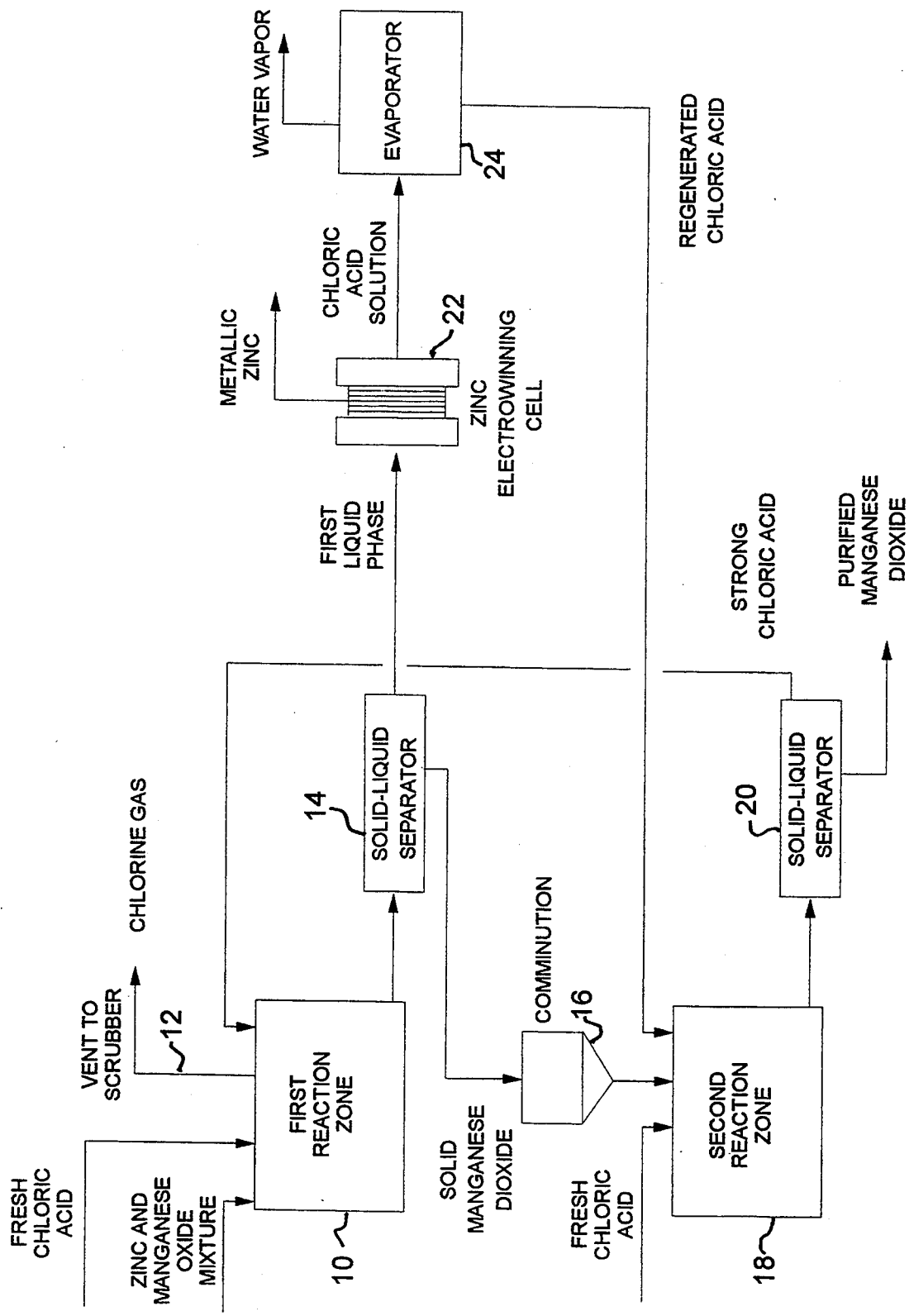

INTEGRATED PROCESS OF USING CHLORIC ACID TO SEPARATE ZINC OXIDE AND MANGANESE OXIDE

CROSS-REFERENCE TO RELATED APPLICATIONS

This application is a continuation-in-part application of U.S. patent application Ser. No. 08/180,838, filed Jan. 12, 1994 with David W. Cawlfield and Leslie R. Ward as the named inventors, which is a continuation-in-part application of U.S. patent application Ser. No. 07/987,503, which was filed on Dec. 7, 1992 with the same two inventors and has now issued as U.S. Pat. No. 5,279,743 on Jan. 18, 1994. Both of the applications and issued U.S. patent are incorporated herein by reference in their entireties.

BACKGROUND OF THE INVENTION

1. Field of the Invention

The present invention relates to an integrated process of using a chloric acid solution to separate mixtures of zinc oxide and manganese oxide by converting the manganese oxide into manganese dioxide and also recovering the zinc and chloric acid values.

2. Brief Description of the Art

The recycling of used batteries is a relatively simple process which starts with expended or defective batteries being milled and then passed through a magnetic separator to remove the iron battery jacket. The resulting iron-free mixture of compounds is heated to temperatures in excess of 300° C. and washed to yield, among other things, a mixture of zinc and manganese oxides. This mixture is stable and non-polluting. This recycling process is advantageous because it results in the production of a stable non-toxic zinc and manganese oxide complex from potentially toxic battery waste. The disadvantage has been that it has not previously been possible to separate the mixture of oxides using existing processing methods. This has resulted in the waste of significant quantities of zinc and manganese metals.

The compounds that are the subject of this reaction are known in the art. Zinc oxide (ZnO) is a white solid that has a molecular weight of 81.38. It has a melting point of 1,975° C. and is soluble in acid, alkali and ammonium chloride. Zinc oxide is insoluble in alcohol and ammonia. Because of its use in the vulcanization process the rubber industry is the largest user of zinc oxide. In addition to many other uses, zinc oxide has also been used as an ingredient in paints, as a trace element nutrient for agricultural products and as a photocopying aid.

Manganese oxide, $Mn_3O_4$, (also known as manganic manganese oxide) has a molecular weight of 228.81 and is thermally the most stable manganese oxide. It is generally in the form of black rhombi crystals that have a melting point of 1,564° C. Manganese oxide is soluble in hydrochloric acid but insoluble in hot and cold water. Different manganese oxides (e.g. $Mn_2O_3$—manganic oxide; MnO—manganous oxide) may be present as well as mixtures of different manganese oxides.

Chloric acid ($HClO_3$) is a strong oxidizing agent whose oxidizing properties vary somewhat with the pH and temperature of the solution. It is fairly stable in cold water solutions of up to about 30% by weight. Upon heating, chlorine and chlorine dioxide may be evolved depending upon the strength of the solution. Aqueous chloric acid solutions may be concentrated by evaporation under reduced pressure to where the chloric acid concentration is greater than 40% by weight.

Manganese dioxide ($MnO_2$) (also known as manganese binoxide, manganese peroxide; manganese superoxide; and black manganese) is a strong oxidizer and is used in the manufacture of manganese steel; in alkaline batteries (dry cells); for making amethyst glass or decolorizing glass; and painting on porcelain, faience, and majolica. It is also used in electrotechnics, pigments, browning gun barrels, drier for paints and varnishes, printing; dyeing textiles; and making potassium permanganate. It is characterized as follows: has a molecular weight of 86.94; when ignited, evolves oxygen and leaves $Mn_3O_4$; insoluble in water, nitric acid, or cold sulfuric acid; slowly dissolves in cold HCl with evolution of $Cl_2$; in the presence of hydrogen peroxide or oxalic acid, it dissolves in dilute $H_2SO_4$ or $HNO_3$.

Manganese dioxide is a naturally occurring substance; it occurs in nature as the mineral pyrolusite. It is also made artificially by various processes.

U.S. Pat. No. 3,640,683, which issued to Miyazaki et al. on Feb. 8, 1972, teaches several processes for making manganese dioxide:

(1) thermal decomposition of manganese nitrate ($MnNO_3$) to manganese dioxide and NO gas;

(2) oxidation of manganese hydroxide [$Mn(OH)_2$] particles with air or an oxidizing agent or oxygen or ozone to form manganese dioxide;

(3) oxidation of manganese sulfate ($MNSO_4$) with an oxidizing agent (e.g., chlorate, hypochlorite, permanganate, or peroxide) to form manganese dioxide and by-product salts and gases;

(4) disproportion of a manganese sub-oxide ($Mn_2O_3$) with sulfuric acid to form manganese dioxide and a manganese sulfate by-product;

(5) thermal decomposition of manganese chloride; and (6) roasting a naturally occurring, but crude, manganese dioxide-containing ore with air or oxygen; then reacting the roasted ore with a hot aqueous solution of chlorate salt and sulfuric acid; separating the formed needle-like manganese dioxide particles from the hot aqueous solution and then washing the separated manganese dioxide with water.

U.S. Pat. No. 4,402,931, which issued to Tanabe et al. on Sep. 6, 1983, teaches a process of producing manganese dioxide by (1) heating and decomposing a solution of ammonia complex of manganese (manganese ammonium carbamate) at a temperature of 68°–80° C.; (2) then optionally roasting the resulting manganese carbonate in air containing 15–85% steam; (3) roasting the manganese carbonate at a temperature of 275°–375° C. in oxygen containing 15–85% steam; and (4) treating the resulting manganese dioxide by heating it in either (a) a diluted sulfuric acid, (b) a solution of sulfuric acid and chlorate, or (c) a solution of sulfuric acid, manganese carbonate and chlorate.

In the commercial process for producing manganese dioxide by chemical oxidation that involves an acidic solution made by sulfuric acid and sodium chlorate salt, the oxidation reaction consumes chlorate and releases chlorine ($Cl_2$) and chlorine dioxide ($ClO_2$) gases as well as producing sodium ions, sulfate ions, sulfuric acid, and chlorate ions as by-products which must be purged from the system. The chlorine ($Cl_2$) and chlorine dioxide ($ClO_2$) gases may be hazardous if large concentrations are formed. These gases and the by-products require neutralization, which may involved large quantities of a base. Accordingly, such processes have important commercial limitations.

U.S. Pat. No. 5,279,743, which issued on Jan. 18, 1994, teaches a process of separating zinc and manganese oxide by (1) reacting said oxide mixture with a chloric acid solution to form a mixture having a solid phase containing manganese dioxide and a liquid phase containing chloric acid solution and dissolved zinc ions contained therein and (2) then separating the solid and liquid phases. This patent further teaches mixing the separated solid phase with a second chloric acid solution to dissolve remaining zinc oxide in the manganese dioxide and then separating that second chloric acid solution containing additional zinc ions from a substantially pure solid manganese dioxide product.

While the teachings of U.S. Pat. No. 5,279,743 represent a significant commercial advance over the preexisting oxidation routes for making manganese dioxide, the problem of recovering both the valuable zinc and chloric acid after separation of the solid manganese dioxide exists.

U.S. patent application Ser. No. 08/180,838, filed Jan. 12, 1994, is directed to reacting manganese oxide with a molar excess of an aqueous chloric acid solution, in a reaction zone to form a liquid/solid reaction mixture wherein the liquid phase contains chloric acid and water and the solid phase contains manganese dioxide; then separating the solid phase from the liquid phase; and removing water from the liquid phase to further concentrate said chloric acid; and finally returning said separated and concentrated chloric acid back to the reaction zone for further reaction with manganese oxide. While this process is an improvement over the process of U.S. Pat. No. 5,279,743 in that the chloric acid values are recovered and reused, it does not offer any answer toward recovering zinc values if zinc oxide is originally present with the manganese oxide. The present invention offers a solution to that remaining problem.

BRIEF SUMMARY OF THE INVENTION

The present invention, therefore, is directed to a process for producing manganese dioxide and elemental zinc comprising the steps of:

(1) reacting a mixture of zinc oxide and manganese oxide with a molar excess of an aqueous chloric acid solution in a reaction zone to form a reaction mixture in said zone comprising chlorine gas, a solid phase containing manganese dioxide, and a liquid phase containing chloric acid, zinc oxide, and water; the concentration of chloric acid in said liquid phase is greater than about 1% by weight of said liquid phase upon leaving the reaction zone;

(2) separating said chlorine gas from said solid phase and said liquid phase;

(3) separating said solid phase containing manganese dioxide from said liquid phase containing chloric acid, zinc ions, chlorate ions, and water;

(4) subjecting said liquid phase to electrolysis in an electrochemical cell, thereby producing zinc metal at the cathode and oxygen at the anode of said cell;

(5) removing water from said separated and electrolyzed liquid phase to further concentrate said chloric acid in said separated liquid phase;

(6) returning said separated and concentrated liquid phase back to said reaction zone for further reaction with manganese oxide; and (7) recovering said zinc metal from said electrochemical cell.

BRIEF DESCRIPTION OF THE DRAWINGS

The Figure represents a flow chart of a preferred integrated process of the present invention.

DESCRIPTION OF PREFERRED EMBODIMENTS

Mixtures of zinc oxide and manganese oxide exist in various forms that present a unique problem in the separation art. While the individual compounds are of value, the mixture has been considered useless because a means of separating the individual compounds has not been known. In fact, the mixture of manganese and zinc oxide has often been used as landfill. In the past, research effort has been directed to finding a form of the mixture that would be non toxic to the environment. It has surprisingly been found that chloric acid can be used to separate mixtures of zinc and manganese oxides no matter what form the mixture takes. Instead of being used as landfill the individual compounds can be separated into substantially pure forms that have utility in the manufacture of batteries.

The claimed process involves the addition of a solution of chloric acid to a mixture of zinc oxide and manganese oxide to form a two phase reaction mixture having a solid phase and a liquid phase. The mixture of zinc oxide and manganese oxide can be a solid or a liquid. The solid form can be a mixture of granules of zinc oxide admixed with granules of manganese oxide or a complex of manganese oxide and zinc oxide having a crystal lattice structure. The claimed process is applicable to all forms of mixtures of zinc oxide and manganese oxides.

It is hypothesized that the manganese oxide is oxidized to solid manganese dioxide while the zinc dissolves into the chloric acid solution.

As shown in the Figure, the first step of the present invention involves the reaction of manganese oxide with a molar excess of chloric acid in reaction zone 10 to form chlorine gas, a solid phase containing manganese dioxide, a liquid phase containing chloric acid and water. This reaction may be represented by the following reaction equation (1):

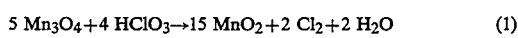

$$5\ Mn_3O_4 + 4\ HClO_3 \rightarrow 15\ MnO_2 + 2\ Cl_2 + 2\ H_2O \quad (1)$$

Because chloric acid is a strong acid, most of the chloric acid will dissociate into hydrogen ions and chlorate ions in aqueous solution. In turn, the zinc oxide, free of the manganese oxide matrix by the above oxidation reaction (1), dissolves by reaction with the hydrogen ions. This may be represented by the following equations (2) and (3):

$$HClO_3 \xrightarrow{H_2O} H^+ + ClO_3^- \quad (2)$$

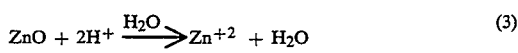

$$ZnO + 2H^+ \xrightarrow{H_2O} Zn^{+2} + H_2O \quad (3)$$

The net result of these reactions is that the product solution contains dissolved zinc chlorate.

The term "manganese oxide" as used in the present specification and claims is defined to mean all forms of manganese oxide. The manganese oxide may be added to the reaction zone in the form of solid granules or crystals or in an aqueous solution or slurry. The present invention also encompasses the use of impure forms of manganese oxide such as mixtures of manganese oxide and manganese carbonate. In the latter case, carbon dioxide would be additional product of this reaction.

Chloric acid solutions suitable for the present invention may be produced by a variety of processes. See U.S. Pat. Nos. 5,064,514, which issued to Cawlfield et al. on Nov. 12, 1991 and 5,108,560, which issued to Cawlfield et al. on Apr. 28, 1992. A source of high purity chloric acid is preferred since impurities in the chloric acid solution would accumulate in the process lines, reaction zone, and concentrating means. For certain applications, it may be desirable to add other chemicals to the reaction zone such as catalysts or crystal growth regulators.

The present invention involves the reaction of manganese oxide with a molar excess of chloric acid in reaction zone 10. As described in more detail below, the source of the chloric acid used in this reaction may be either fresh chloric acid solution and/or recycled concentrated chloric acid solution. The instant reaction forms water, chlorine gas, and solid manganese dioxide. The reaction mixture in the reaction zone 10 will contain (1) unreacted manganese oxide; (2) unreacted zinc oxide; (3) unreacted chloric acid (some of which may have disassociated into chlorate and hydrogen ions); (4) dissolved zinc chlorate; (5) water present in the chloric acid solution and, optionally, which entered with a manganese oxide slurry; (6) water formed by this oxidation reaction; (7) formed chlorine gas; and (8) formed solid manganese dioxide.

The molar excess of chloric acid in the reaction zone 10 allows for completion of the desired reaction and the later concentration and recycle of the chloric acid values. The preferred molar excess of chloric acid is from about 10% to about 300% by moles over the stoichiometric amount needed to convert the manganese oxide. The optimum chloric acid concentration in the fresh chloric acid solution added to the reaction zone 10 may be from about 5% to 40% by weight. The concentration of total chloric acid entering the reaction zone (i.e., fresh chloric acid combined with a recycled concentrated chloric acid solution) should be sufficient so that the liquid phase exiting the reaction zone comprises an aqueous chloric acid solution having a concentration of at least about 1% by weight, preferably at least about 5%.

The reaction zone 10 may be any suitable reaction apparatus for reacting an aqueous solution of chloric acid with manganese oxide. Preferably, the reaction zone 10 is a tube reactor equipped with a gas venting system.

The reaction of the reaction zone 10 is preferably carried out from ambient temperature (e.g., about 20°–30° C.) to boiling temperatures (e.g., 95°–100° C.). More preferably, the reaction is carried out at temperatures from about 40° C. to about 80° C. The preferred reaction pressure is atmospheric, although super-atmospheric and sub-atmospheric pressures may be used. The average reaction time in the reaction zone should be sufficient to achieve a 100% conversion of the manganese oxide to manganese dioxide. Preferably, reaction times from about 1 minute to about 240 minutes may be employed.

The chlorine gas which evolves from the present reaction may be vented to a scrubber (not shown) for later recovery. Preferably, the chlorine gas is vented directly from the reaction zone by line 12 and may be recovered for use in other processes. The vented chlorine gas may also be employed to pretreat the mixture of zinc and manganese oxides before entering reaction zone 10. Such pretreatment may entail removal of residual alkali values.

The reaction mixture, after the removal of the chlorine gas, consists of the solid phase containing manganese dioxide and a liquid phase containing water, unreacted zinc oxide, zinc chlorate, and chloric acid. The solid phase is then separated from the liquid phase in solid liquid separator 14. This may be any suitable standard solid liquid separation apparatus. The separation may be carried out using any standard separation technique. Filtration is one preferred method of separation.

The separated manganese dioxide is preferably washed with water and then preferably dried to yield a dry manganese dioxide product. The manganese dioxide may be dried using any standard drying technique. The preferred method of drying is oven drying at elevated temperatures, preferably from about 70° C. to about 90° C.

Alternatively, the separated solid manganese dioxide may preferably be subjected to a comminution step in any suitable comminution means 16, and then preferably contacted in a second reaction zone 18 with another chloric acid treatment. This second stage chloric acid treatment may involve the same process parameters and type of apparatus as the first stage. This second stage will effect a solubilization of zinc values (i.e., zinc oxide impurities) remaining in the manganese dioxide solution. This second stage will also convert any remaining manganese oxide impurities in the solids to manganese dioxide. After the treatment, the solid liquid mixture is separated in a second solid liquid separator 20 in a manner similar to the first stage. The separated manganese dioxide solids may be recovered and the separated chloric acid solution may be recycled to the first reaction zone 10 for further reaction with the manganese oxide. If the liquid phase leaving solid liquid separator 20 is recycled back to reaction zone 10, the chloric acid in that recycled liquid phase is greater than 5% by weight, preferably greater than 10% by weight, of that liquid phase leaving that solid liquid separator 20. The comminution means 16 may include conventional mechanical means such as grinding, cutting, shredding, chopping, or crushing means as well as chemical reactions that cause comminution. Chloric acid makeup can be added to this second stage rather than directly to the first.

The separated liquid phase from the first reaction zone contains (1) dissolved zinc ions and chloric ions, (2) chloric acid (including some dissociated hydrogen ions), (3) water from the fresh makeup chloric acid and recycled concentrated chloric acid solutions, and (4) water formed by the reaction of chloric acid and manganese oxide. This separated liquid phase is then passed through an electrochemical cell 22, preferably in an undivided electrochemical cell, such as a zinc electrowinning cell, where it is subjected to electrolysis. The electrolysis produces zinc metal at the cathode and oxygen at the anode. The elemental zinc may be removed by periodically replacing cathodes or by operating the electrolysis at such a rate that particulate zinc is formed.

During electrolysis, the acidity of the electrolyte is controlled by dilution with water or fresh zinc chlorate solution to be less than about 1.0 molar so as to reduce or eliminate the likelihood of forming chlorine dioxide at the cathode or perchloric acid at the anode by competing electrolysis reactions. Also, during electrolysis some of the dissociated chlorate ions may be converted into chloric acid. In other words, the chloric acid strength in the separated liquid phase may be greater after the electrolysis step than before that step. Thus, the electrolysis may reduce the amount of evaporation of water vapor in the subsequent evaporation step. The spent electrolyzed chlorate solution, still containing some residual zinc chlorate may be concentrated, for example by evaporation, and then returned to the reactor for separating zinc/manganese mixed oxides. The net effect of this electrochemical recovery process is to produce a higher value product of metallic zinc and to make more efficient use of all of the oxidizing potential of chloric acid.

The separated and electrolyzed liquid phase which contains (1) chloric acid, (2) remaining dissolved zinc chlorate, (3) water from the fresh chloric acid and recycled concentrated chloric acid solutions, and (3) water formed in the reaction of chloric acid and manganese oxide is then concentrated preferably in an evaporator 24. As mentioned above, the concentration of the chloric acid in this separated liquid phase is at least about 1% by weight of this liquid phase. In the evaporator 24, the separated liquid phase is subjected to elevated temperatures and reduced pressures to remove water from the liquid phase and thereby form a more concentrated solution of chloric acid. Preferably, this evaporation is carried out at temperatures of about 50–85° C. and at subatmospheric pressures preferably a vacuum pressure of 1–15 inches of mercury (i.e., about 0.03–0.5 atmospheres). The regenerated chloric acid solution leaving the evaporator has generally a chloric acid concentration of about 20% to about 40% by weight. Alternatively, the concentration of the chloric acid may be carried out by freeze concentration, reverse osmosis, and electrodialysis. The separated water vapor from the evaporator may be disposed of or employed in other processes. Alternatively, that water vapor may be condensed and then recycled back to the first liquid phase stream to aid in obtaining the optimum water concentration for the zinc electrowinning cell.

The regenerated chloric acid solution leaving the evaporator 24 is then returned to either the first reaction zone 10 or second reaction zone 18 for further reaction with more manganese oxide. The ratio of regenerated or recycled chloric acid solution to fresh chloric acid solution added to either reaction zone 10 or 18 may preferably be from 95:5 to 5:95 by moles of chloric acid for each solution. The process of the present invention may be carried out in suitable apparatus, including a single vessel where the reaction, liquid/solid separation, and chloric acid concentration are all carried out simultaneously.

This process has the benefit that no toxic liquid waste streams are generated and that the oxidation reaction takes place more rapidly and completely than prior art processes which utilize a sulfuric acid/chlorate oxidizer. Because no liquid waste stream is generated, essentially no manganese or zinc values are lost by this process. Also, the chloric acid consumption is lower than the equivalent chlorate consumption in the conventional sulfuric acid/chlorate process.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for producing manganese dioxide and zinc metal comprising the steps of:
   (1) reacting a mixture of zinc oxide and manganese oxide with an aqueous chloric acid solution wherein the chloric acid is in molar excess to the manganese oxide in a reaction zone to form a reaction mixture in said zone consisting essentially of chlorine gas, a solid phase containing manganese dioxide, and a liquid phase containing zinc ions, chlorate ions, chloric acid, and water; the concentration of chloric acid in said liquid phase is greater than about 1% by weight of said liquid phase upon leaving the reaction zone;
   (2) separating said chlorine gas from said solid phase and said liquid phase;
   (3) separating said solid phase containing manganese dioxide from said liquid phase containing zinc ions, chlorate ions, chloric acid, and water thereby forming a separated solid phase and a separated liquid phase;
   (4) subjecting said separated liquid phase to electrolysis in an electrochemical cell, thereby producing zinc metal at the cathode and oxygen at the anode;
   (5) removing water from said separated liquid phase to concentrate said chloric acid in said separated liquid phase thereby forming a separated and concentrated liquid phase;
   (6) returning said separated and concentrated liquid phase back to said reaction zone; and
   (7) recovering said zinc metal from said electrochemical cell.

2. The process of claim 1 wherein the molar excess of chloric acid entering the reaction zone to manganese oxide entering the reaction zone is from about 10% to about 300% of the stoichiometric amount needed to convert the manganese oxide.

3. The process of claim 1 wherein the step (1) is carried out at a reaction temperature of from about 20° C. to about 100° C.

4. The process of claim 1 wherein said separating step (3) comprises filtering said solid phase from said liquid phase.

5. The process of claim 1 wherein said separated solid phase containing manganese dioxide is washed with water and then dried to form a dry manganese dioxide product.

6. The process of claim 1 wherein said removing water step (5) comprises evaporating water from said separated liquid phase.

7. The process of claim 6 wherein said evaporating is carried out at a temperature from about 50° C. to about 85° C. at a subatmospheric pressure.

8. The process of claim 7 wherein the concentration of the chloric acid in the separated and concentrated liquid phase after said evaporating is from about 20% to about 40% by weight chloric acid.

9. The process of claim 1 wherein said electrolysis in step (4) is carried out in an undivided electrochemical cell and zinc metal is plated onto the cathode.

10. The process of claim 1 wherein said separated solid phase in step (3) is comminuted.

11. The process of claim 1 wherein said separated solid phase in step (3) is reacted with an aqueous chloric acid solution in a second reaction zone to dissolve zinc oxide impurities remaining in said separated solid phase and to react any manganese oxide impurities remaining in said separated solid phase, thereby forming a second solid phase containing purified manganese dioxide solids and a second liquid phase containing chloric acid and zinc oxide impurities, and then separating said second solid phase from said second liquid phase, thereby forming a second separated solid phase and a second separated liquid phase.

12. The process of claim 11 wherein said aqueous chloric acid solution employed in said second reaction zone is a mixture of fresh chloric acid solution and said separated and concentrated liquid phase from step (5) and wherein said second separated liquid phase from said second reaction zone is returned to said first reaction zone.

13. The process of claim 12 wherein the mole ratio of chloric acid from said separated and concentrated liquid phase entering said second reaction zone from step (5) to chloric acid from fresh chloric acid solution entering the reaction zone in step (1) is from about 95:5 to 5:95.

* * * * *